United States Patent [19]

Ishizaki et al.

[11] Patent Number: 4,856,174
[45] Date of Patent: Aug. 15, 1989

[54] METHOD OF MAKING A STAINLESS STEEL VACUUM BOTTLE WITH A SILVER MIRRORED SURFACE

[75] Inventors: Hidetsurumaro Ishizaki, Hirakata; Riyozo Taguchi, Higashi, all of Japan

[73] Assignee: Zojirushi Vacuum Bottle Co., Ltd., Osaka, Japan

[21] Appl. No.: 735,307

[22] Filed: May 17, 1985

Related U.S. Application Data

[63] Continuation of Ser. No. 524,592, Aug. 19, 1983, abandoned.

[30] Foreign Application Priority Data

Aug. 25, 1982 [JP] Japan ............................... 57-148162
Dec. 6, 1982 [JP] Japan ............................... 57-214113
Jul. 25, 1983 [JP] Japan ............................... 58-136436

[51] Int. Cl.$^4$ ..................... B05S 3/04; B23P 25/00; C23C 8/06
[52] U.S. Cl. ..................... 29/455.1; 29/458; 29/460; 148/289; 220/424; 220/454; 220/456; 427/319

[58] Field of Search ............... 148/6.35; 427/319, 437, 427/443.2, 319, 437, 443.2; 29/455 R, 455 LM, 460, 527.2, 455.1, 458; 220/420–425, 454, 456

[56] References Cited

U.S. PATENT DOCUMENTS

| 2,210,850 | 8/1940 | Curtin .......................... 148/6.35 X |
| 2,776,069 | 1/1957 | Zimmermann ..................... 220/424 |
| 3,343,999 | 9/1967 | Petermann ..................... 148/6.35 X |
| 4,394,929 | 7/1983 | Patel et al. ..................... 220/421 |
| 4,427,123 | 1/1984 | Komeda et al. .................. 215/13 R |
| 4,448,809 | 5/1984 | Nagai et al. ..................... 427/437 X |

*Primary Examiner*—Allan N. Shoap
*Attorney, Agent, or Firm*—Stevens, Davis, Miller & Mosher

[57] ABSTRACT

A stainless steel vacuum bottle comprises inner and outer bottles made of stainless steel, the inner and outer bottles being joined together at tip portions of their bottle necks to form a double-walled construction with a space between the two bottles, the space being evacuated. The vacuum bottle is characterized in that surfaces surrounding the space of the inner and outer bottles are provided, on at least the outer surface of the inner bottle, with an oxide layer and a silver mirror layer formed thereon.

6 Claims, 1 Drawing Sheet

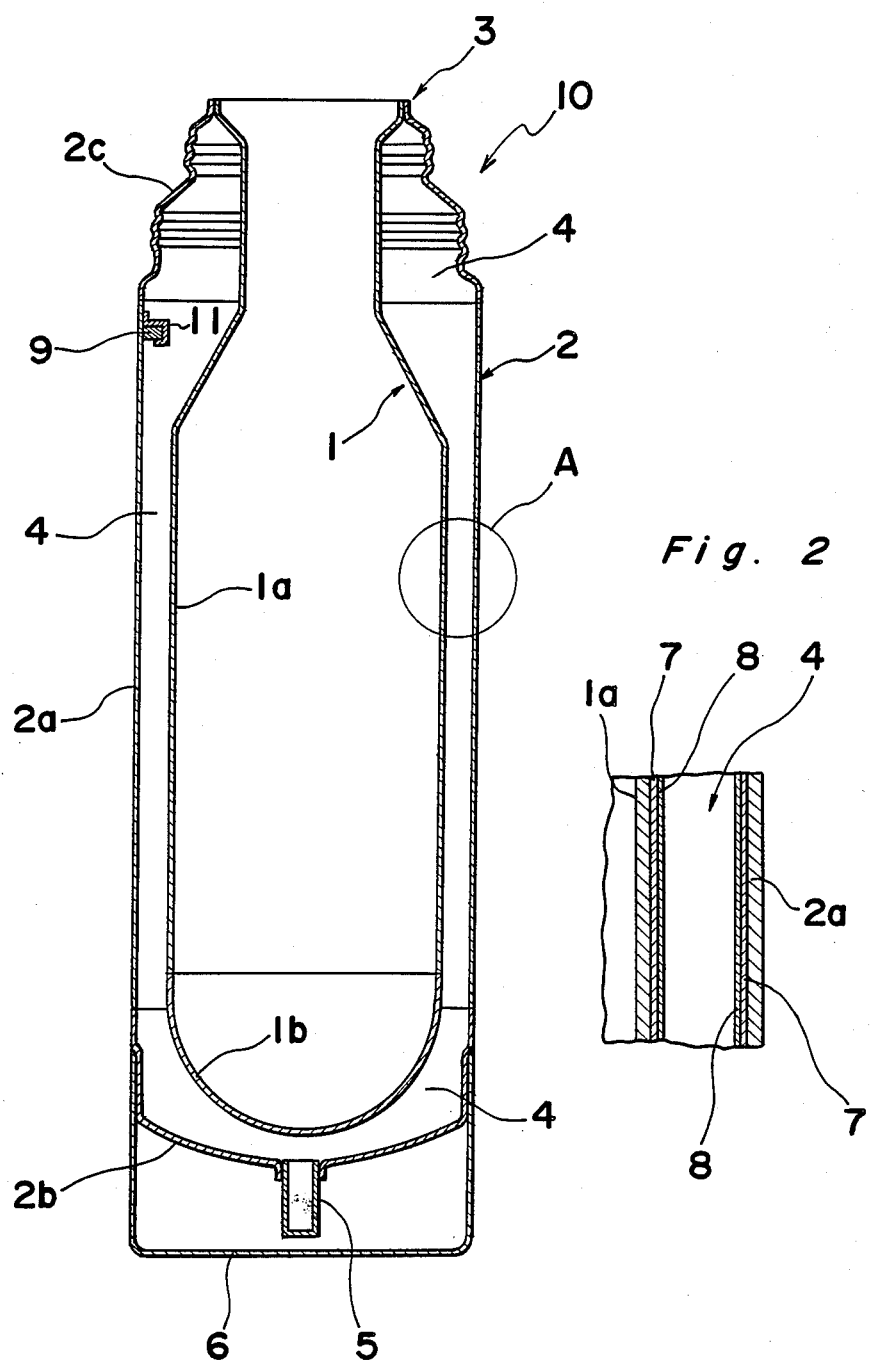

METHOD OF MAKING A STAINLESS STEEL VACUUM BOTTLE WITH A SILVER MIRRORED SURFACE

This application is a continuation of application Ser. No. 524,592 filed Aug. 19, 1983, now abandoned.

BACKGROUND OF THE INVENTION

1. Field of the Invention

This invention relates to stainless steel vacuum bottles and a process for producing the same.

2. Description of the Prior Art

Vacuum bottles which are now widely used are usually made of glass and have a double walled construction with a space between the two walls, said space being evacuated and the surfaces of the walls, which face the vacuum, being coated with silver mirror layers to minimize transfer of heat to or from the interior of the vacuum bottle. Such glass vacuum bottles have high heat-insulating properties, but are poor in resistance to mechanical shocks.

Metal vacuum bottles have been also known and described, for example, in U.S. Pat. Nos. 1,551,778, 1,566,221 and 3,331,522. The vacuum bottles made of steel such as electrolytic iron have been provided with coatings of silver or chromium on surfaces facing the vacuum, i.e., the outer surface of the inner bottle and the inner surface of the outer bottle to minimize transfer of heat to or from the interior of the bottle. These metal vacuum bottles have high resistance to mechanical shocks but are inferior to glass vacuum bottles in the heat-insulating properties because steel has low reflectively and high conductivity. Also, steel is poor in resistance to corrosion, and it is therefore necessary to protect the uncoated surfaces of the vacuum bottle, i.e., the inner surface of the inner bottle and the outer surface of the outer bottle. For this end, these metal vacuum bottles have been mounted in a casing made of plastic material and the inner surface of the inner bottle have been coated with vitreous enamel or plated with chromium. Other metal vacuum bottles, such as that described in U.S. Pat. No. 3,331,522, comprise an inner bottle made of aluminium. Aluminum has very low heat emissivity and high heat reflection, thus making it possible to improve the heat insulating properties. Also aluminum has high corrosion resistance, and therefore makes it unnecessary to protect the inner surface of the inner bottle from the corrosion with a vitreous enamel or nickel plating. However, such vacuum bottles have the following disadvantages. Since aluminium has high heat conduction, it is necessary to make a neck with a low heat conducting material such as stainless steel to minimize heat transfer due to heat conduction. Since aluminium is a soft material and is apt to be deformed by mechanical shocks, it is necessary to make the outer bottle with steel such as mild iron to prevent the same from the damage, resulting in a complex manufacturing process. Also, it is necessary to protect the outer bottle from corrosion.

It has been known that stainless steel has high resistance to corrosion and high mechanical strength, and therefore some attempts have been made to produce vacuum bottles with stainless steel. The stainless steel enables to prevent the vacuum bottles from corrosion and damage, but has a serious disadvantage that the vacuum bottles made of stainless steel are considerably inferior to the glass vacuum bottles in heat-insulating properties which are the most important properties of the vacuum bottles. This problem mainly depends on physical properties of stainless steel and the construction of the vacuum bottles. Firstly, stainless steel is low in heat conductivity but high in heat emissivity, and the transfer of heat due to radiation is a dominant factor in the vacuum bottles. It is therefore difficult to manufacture stainless steel vacuum bottles with good heat-insulating properties. Secondary, metals including stainless steel contain some gases such as hydrogen, and the gases contained therein would be liberated under the reduced pressure from the wall surfaces facing the vacuum. Thus, the vacuum in the space between the two walls would become progressively worse with time. Thirdly, a silver mirror reaction does not occur on the surface of stainless steel. Accordingly, the transfer of heat due to radiation cannot be reduced by providing silver mirror layers on the wall surfaces of the vacuum bottle. For this reason, the prior art vacuum bottles made of stainless steel, such as that described in Japanese patent publication No. Sho 57-22571, have been provided with vitreous layers consisting of silicon dioxide on the wall surfaces facing the vacuum, and silver mirror layers being formed thereon. Such stainless steel vacuum bottles have heat-insulating properties sufficient for the practical use, but it is difficult to form uniform vitreous silicon dioxide layers on the surfaces of the stainless steel, resulting in a wide scatter of qualities of the vacuum bottles. In other stainless steel vacuum bottles, such as that described in Japanese patent application laid-open No. Sho 57-75621, nickel plating have been provided on the wall surfaces facing the vacuum, and silver mirror layers have been formed thereon. These stainless steel vacuum bottles also have heat-insulating properties sufficient for the practical use and maintain their heat-insulating properties for a long time. However, such a construction of vacuum bottles makes a process complicated and causes increase of manufacturing cost because nickel must be plated on individual bottle members before assemblying these members into a double walled bottle.

It has also been known that the stainless steel vacuum bottles may be prevented from lowering of the vacuum by use of a non-evaporable getter which sorps gases liberated from the surfaces of stainless steel facing the vacuum. However, the use of getters makes it complicate to manufacture the vacuum bottles. In general, the stainless steel vacuum bottles having a double walled construction with a space between the two walls, have been produced by a process comprising the steps of preparing bottle members made of stainless steel, plating nickel on surfaces of the members, welding these members to form a double-walled bottle, evacuating the space between the two walls, and then sealing the tip tube. When a getter is employed to prevent the vacuum bottle from lowering of the vacuum, the getter must be arranged in the space between the two walls after forming silver mirror layers but just before welding of the bottle members to form the double-walled bottle. Because, the conventionally used getters such as, for example, Zr-Al alloys loses its functions when it is in contact with water or chemicals. Thus, it is necessary to temporarily assemble bottle members with contractible tubes or rubber rings into a double-walled bottle to form silver mirror layers on the surfaces facing the vacuum and, this necessarily requires disassembling of the double-walled bottle into respective members after formation of silver mirror layers to mount a getter on one of the members, for example, an inner surface of the outer barrel. Accordingly, the prior art vacuum bottles made of stainless steel have problems awaiting solution.

OBJECTS OF THE INVENTION

It is therefore an object of the present invention to provide a stainless steel vacuum bottle which has high heat-insulating properties comparable to those of the glass vacuum bottles.

Another object of the present invention is to provide stainless steel vacuum bottles which can be manufactured with ease and low manufacturing cost.

A further object of the present invention is to provide a process for manufacturing stainless steel vacuum bottles that makes it possible to manufacture stainless bottles with high heat retaining properties and uniform qualities at low cost.

These and other objects, features and advantages of the present invention will be further apparent from the following description taken in conjunction with the several figures of the accompanying drawings which show, by way of example only, one form of a stainless steel vacuum bottle embodying the present invention.

BRIEF DESCRIPTION OF THE DRAWINGS

FIG. 1 is a sectional view of a stainless steel vacuum bottle according to the present invention; and FIG. 2 is an enlarged sectional view of a part indicated by a symbol A in FIG. 1.

DETAILED DESCRIPTION OF THE INVENTION

It has been now found that a silver mirror reaction may take place on a surface of stainless steel, provided that the surface of stainless steel is oxidized to such an extent that an oxide layer mainly comprising ferric oxide is formed thereon. The oxidation of the surface of stainless steel may be carried out so that the relative-specular glossiness of the stainless steel surface is lowered by 10 to 50% as compared with that of the unoxidized, polished surface of stainless steel. If the surface of stainless steel is oxided to such an extent that lowering of the glossiness is less than 10%, it is impossible to form silver mirror layer on the surface of stainless steel plate. The excess oxidation of the stainless steel surface, which causes lowering of the glossiness more than 50%, results in the formation of oxide layer consisting of chromium oxide which prevents the surface from a silver mirror reaction, thus making it difficult to form silver mirror layers thereon.

The oxide layer of the vacuum bottle may be formed by firing the inner and outer bottles in an oxidizing atmosphere such as air or oxygen-containing atmosphere. This firing or oxidizing treatment is carried out at 250° to 550° C. for 5 to 120 minutes, preferably, 300° to 450 ° C. for 10 to 60 minutes.

The reasons why such phenomena occur, although being not completely elucidated, are considered that the surface of stainless steel insufficiently oxidized is prevented from silver mirror reaction by chromic oxide coexistent with ferric oxide, and that excessively oxidized surface contains no ferric oxide but only chromic oxide which prevent stainless steel from silver mirror reaction In addition, it has been surprisingly found that some non-evaporable getters, particularly, ternary gettering alloys of a Zr-V-Fe or Zr-Ni-Nb system do not lose its gas-sorption properties even after they are immersed in water or in silver solution containing sodium hydroxide, ammonia, glucose, stannous chloride and non-ionic surface active agent, etc. and can be activated by heating in vacuum at a relatively lower temperature within a range of 300° to 600° C.

According to the present invention, there is provided a stainless steel vacuum bottle comprising inner and outer bottles made of stainless steel, said inner and outer bottles being joined together at tip portions of their bottle necks to form a double-walled construction with a space therebetween, said space being evacuated, said vacuum bottle being characterized in that surfaces of the inner and outer bottles surrounding said space are provided, on at least the outer surface of the inner bottle, with an oxide layer and a silver mirror layer formed thereon.

In a preferred embodiment, a stainless steel vacuum bottle further comprises a non-evaporable getter of a ternary alloy of Zr-V-Fe system or Zr-Ni-Nb system, said getter being arranged in the evacuated space between the inner and outer bottles.

The preferred non-evaporable getter of ternary alloy Zr-V-Fe used for the vacuum bottle of the present invention consists essentially of 45 to 75 wt % of Zr, 20 to 50 wt % of V and 5 to 35 wt % of Fe. If the content of zr is out of the above range, the alloy would release hydrogen during sorption of water and would become too plastic, resulting in difficulties in transformation of the alloy fine power. If the content of V is less than 20 wt %, it is impossible to obtain the getter with the desired sorption properties. If the content of V exceeds 50 wt %, the alloy would have a considerably low ignition temperature thus making it impossible to put it into practical use. Fe is incorporated into the alloy to elevate its ignition temperature. If the content of Fe is less than 5 wt %, it is impossible to achieve its object. If the content of Fe exceeds 35 wt %, it causes deterioration of the absorption properties of the alloy.

Referring to FIG. 1 there is shown a stainless steel vacuum bottle 10 according to the present invention, which generally comprises an inner wall or bottle 1 and an outer wall or bottle 2, both of which are made of stainless steel. The inner bottle 1 is mounted within the outer bottle 2 and joined therewith at its upper end by a suitable joining means such as soldering or welding, to form a double-walled construction with a space between the two bottles, said space being evacuated to minimize transfer of heat. The bottom 2b of the outer bottle 2 is provided with a tip tube 5 though which the space 4 between the two walls is evacuated. A bottom cap 6 is fixed on the bottom of the outer bottle 2 to protect the tip tube 5.

In order to improve the heat-insulating properties, the vacuum bottle of the present invention shown in FIG. 1 is provided with oxide layers on the wall surfaces surrounding the space between two bottles, i.e, an outer surface of the inner bottle and an inner surface of the outer bottle, and silver mirror layers are provided on the oxide layers, as shown in FIG. 2. In the embodiment shown in FIGS. 1 and 2, the silver mirror layers are formed on all the surfaces facing the vacuum, but it is sufficient for the practical use to provide a silver mirror layer only on the outer surface of the inner bottle. This contributes to reduce the manufacturing cost of the vacuum bottles.

The vacuum bottle according to the present invention further comprises a non-evaporable getter 9 of Zr-V-Fe alloy mounted the inner surface of the barrel 2a of the outer bottle 2. The getter 9 sorps gases liberated from the stainless steel wall and prevent the vacuum bottle from lowering of the vacuum, thus making it possible to keep the heat-insulating properties constant for a long time. Numeral 11 is a holder welded to the barrel 2a of the outer bottle 2 to hold the getter 9 in position.

According to the present invention, the vacuum bottle mentioned above may be produced, for example, in the following manner. A stainless steel plate is shaped into inner bottle members, a barrel 1a with a neck portion 1c, and a bottom member 1b, which are then joined together by welding to form an inner bottle 1 with a narrow neck. Also, there are prepared three bottle members for the outer bottle 2, i.e., a barrel 2a, a bottom member 2b and a shoulder member 2c. The shoulder member 2c is joined at its tip end to the tip end of the inner bottle 1 by welding. The inner bottle 1 and the outer bottle members 2a, 2b are fired in an oxidizing atmosphere, for example, in air at temperatures ranging from 250° to 550° C., for 5 to 120 minutes.

After the firing treatment, the barrel 2a and bottom member 2b are joined in turn to the shoulder member 2c previously joined to the inner bottle 1 to form the outer bottle 2, and thereby completing a double-walled bottle with a space 4 between the inner and outer bottles. When using a getter 9, it is mounted on one of the bottle members, for example, on the inner surface of the outer barrel 2a by fixing a holder 11 thereto, after the firing treatment but before joining the barrel 2a to the shoulder member 2c. The thus constructed double-walled bottle is then subjected to a silver mirror reaction to form silver mirror layers on the oxide layers formed on the surfaces surrounding the space 4 of the bottle. The formation of silver layers may be carried out in the conventional manner by using a silver solution as used for the production of glass vacuum bottles, for example, by a process comprising the steps of pouring an activating solution into the space 4 through a previously mounted tip tube 5 to activate the oxide layers on the surfaces facing the space of the bottle, discharging said activating solution, washing the surfaces facing the space of the bottle, and then pouring the silver solution into the space 4 of the bottle through the tip tube 5 to form silver layers on the oxide layers. Although the activation treatment may be omitted, it is preferred to carry out this treatment to shorten the time required for the formation of the silver mirror layers.

After forming the silver mirror layers, the surfaces surrounding the space of the bottle is washed with water, and then dried. The thus treated double-walled bottle is then evacuated by vacuum pumps to a vacuum of about $10^{-3}$ to $10^{-4}$ Torr. During this process, the bottle is heated to 300° to 900° C. to remove absorbed or adsorbed gases from its surfaces surrounding the space 4 and to activate the getter 9. After the vacuum treatment, the double-walled bottle is sealed off by closing the tip tube 5, and the bottom cap 6 is then fixed to the bottom member 2b to complete the vacuum bottle 10 shown in FIG. 1.

The thus constructed stainless steel vacuum bottles of the present invention have improved heat-insulating properties as compared with the prior art stainless steel vacuum bottles in which vitreous layer or nickel plating is placed between the stainless steel surface and the silver layer. The vacuum bottles of the present invention maintain the heat-insulating properties constant for a long time.

Also, according to the present invention it is possible to form silver mirror layers on the surfaces surrounding the space to be evacuated only by carrying out the chemical plating of silver after the firing treatment, thus making it possible to produce vacuum bottles with ease and at low cost. In addition, according to the present invention the getter can be arranged in the space of the bottle before silver plating, so that it is unnecessary to primary assemble of the double-walled bottle.

EXAMPLE 1

Using a sheet of stainless steel (SUS 304) with a 0.5 mm thickness, there was prepared an inner barrel 1a having a shoulder 1c, and a bottom member 1b, which are then welded to complete an inner bottle 1. Separate from the above, there were prepared an outer barrel 2a, a bottom member 2b and a shoulder member 2c, using a sheet of stainless steel (SUS 304) with a 0.6 mm thickness. The inner bottle 1 and the shoulder member 2c of the outer bottle were joined at their tip ends 3 by welding, and then fired in air at 350° C. for 30 minutes to form an oxide layer on the outer surface of the inner bottle 1. Then, the outer bottle members 2a and 2b were joined to the shoulder member 2c by welding to form a double-walled bottle with a space between the two bottles.

A solution containing 10 ppm of stannous chloride was poured into the space 4 between the inner and outer bottles through a tip tube 5 previously mounted on the bottom member 2b of the outer bottle to activate the oxidized outer surface of the inner bottle 1, and then discharged therefrom. After washing with water, a silver solution prepared in a manner mentioned below was poured into the space 4 through the tip tube 5 to form a silver layer on the outer surface of the inner bottle. During this process, the double walled bottle was horizontally arranged and rotated at high rate to deposit silver mirror on the oxidized outer surface of the inner bottle as shown in FIG. 2. The double walled bottle 1 was then washed, dried, evacuated to a vacuum of about $10^{-4}$ Torr with heating, and then sealed off by closing the tip tube 5. A bottom cap 6 is fixed to the bottom member 2b to complete the vacuum bottle with a volume of 0.75 liter having a construction shown in FIG. 1.

(Preparation of silver solution)

A solution prepared by dissolving 10 g of silver nitrate in 50 ml of water was added 500 ml of 28% ammonia water, and distilled water was added thereto to make a total volume of 4800 ml. To the resultant solution was added 200 ml of solution containing 10 g of sodium hydroxide to give a solution A. A solution prepared by dissolving 10 g of cone sugar in 50 ml of water was added 0.25 ml of concentrated nitric acid, boiled and then added with 5 ml of 37% formaldehyde, and then water was added thereto to make a total volume of 5000 ml of a solution B. The above solution A and solution B were mixed in the ratio by volume of 1:1 to prepare a silver solution.

The thus produced vacuum bottle was subjected to measurement of its heat insulating properties. The test was carried out by a process defined by JIS S2005-1975. The vacuum bottle was filled with boiling water, stoppered with a plug after the water being cooled to 95° C., and then allowed to stand for 6 or 24 hours at 20° C. The temperatures of filled water after the elapse of 6 and 24 hours are 82.5° C. and 59.9° C., respectively.

To determine preferred firing conditions, a 0.3 mm thick stainless steel (SUS 304) was cut into a plurality of test specimens which were polished and then fired in air under respective firing conditions listed in Table 1. After firing treatment, the specimens were subjected to measurements of relative-specular glossiness of their surfaces, and then plated in the same manner as mentioned above by using the silver solution prepared in Example 1. The results are also shown in Table 1.

The relative-specular glossiness of each specimen was measured under the following conditions by using a full goniophotometer (Model UGV-4D, made by Suga Shinkenki Kabushiki-kaisha). The measurements were carried out under the conditions defined by JIS Z8741 which corresponds to ASTM D 523-53T. The incident angle was 60°.

TABLE 1

| Firing condition | | Glossiness | |
|---|---|---|---|
| Temp. (°C.) | Time (min) | $G_s$ (60°) (%) | Silver plating |
| unfired | | 122 | uncovered |
| 250 | 30 | 112 | " |
| 300 | 15 | 105 | good |
| 300 | 30 | 101 | " |
| 300 | 60 | 101 | " |
| 400 | 15 | 81 | " |
| 400 | 30 | 79 | " |
| 400 | 60 | 77 | " |
| 500 | 60 | 62 | uncovered |
| 550 | 30 | 62 | " |

As will be understood from this Table, the silver plating can be achieved when the stainless steel is fired to such an extent that its relative-specular glossiness is lowered by about 10 to 50% from that of the unfired surface of the stainless steel.

EXAMPLE 2

Using a sheet of stainless steel (SUS 304) with a 0.5 mm thickness, there was prepared an inner bottle 1 in the same manner as described in Example 1. An outer barrel 2a, a bottom member 2b and a shoulder member 2c were also prepared by using a sheet of stainless steel (SUS 304) with a 0.6 mm thickness. The inner bottle 1 and the shoulder member 2c of the outer bottle were joined together at their tip ends 3 by welding, and then fired in air at 350° C. for 30 minutes to form an oxide layer on the outer surface of the inner bottle 1. An arched getter body of 70wt % Zr- 24wt % V-6 wt % Fe alloy was fixed to the inner surface of the outer barrel 2a, and then barrel 2a and the bottom member 2b were joined to the shoulder member 2c by welding to form a double-walled bottle with a space between the two bottles.

The thus prepared double walled bottle was chemically plated in the same manner as described in Example 1 to form a silver layer on the oxidized outer surface of the inner bottle 1, and the space between the two bottles was evacuated to $10^{-4}$ Torr.

The heat-insulating properties of the thus produced vacuum bottle were 82.5° C. and 59.9° C., respectively, after the lapse of 6 and 24 hours.

EXAMPLE 3

Using a sheet of stainless steel (SUS 304) with a 0.5 mm thickness, there was prepared an inner bottle 1 in the same manner as described in Example 1. An outer barrel 2a, a bottom member 2b and a shoulder member 2c were also prepared by using a sheet of stainless steel (SUS 304) with a 0.6 mm thickness. The inner bottle 1 and the shoulder member 2c of the outer bottle were joined together at their tip ends 3 by welding, and then fired in air at 350° C. for 30 minutes to form an oxide layer on the outer surface of the inner bottle 1. The outer barrel 2a was provided with an arched getter body of 68wt % Zr- 22wt % Ni- 10wt % Nb alloy on its inner surface, joined together with the bottom member 2b and then joined to the shoulder member 2c by welding to form a double-walled bottle with a space between the two bottles.

Using a silver solution mentioned below, the double walled bottle thus prepared was chemically plated in the same manner as described in Example 1 to form a silver layer on the oxidized outer surface of the inner bottle 1, and the space between the two bottles was evacuated to $10^{-4}$ Torr.

(Preparation of silver solution)

To a solution prepared by dissolving 10 g of silver nitrate in 50 ml of water was added 500 ml of 28% ammonia water, and distilled water-was added thereto to make a total volume of 4800 ml. To the resultant solution was added 200 ml of solution containing 10 g of sodium hydroxide to give a solution A. To a solution prepared by dissolving 20 g of cone sugar in 50 ml of water was added 0.25 ml of concentrated nitric acid, boiled and then added with 5 ml of 37% formaldehyde, and then water was added thereto to make a total volume of 5000 ml of a solution B. The above solution A and solution B were mixed in the ratio by volume of 1:1 to prepare a silver solution.

The heat-insulating properties of the thus produced vacuum bottle were 84° C. and 62° C., respectively, after the lapse of 6 and 24 hours.

What is claimed is:

1. A process for the production of a stainless steel vacuum bottle of the kind wherein the vacuum bottle comprises inner and outer bottles and has a double walled construction with a space between said two bottle, said space being evacuated, characterized in that said process comprises the steps of preparing the inner bottle member in an oxidizing atmosphere at a temperature ranging from 300° to 450° C. for 10 to 60 minutes to produce an oxide layer on which a silver mirror layer is to be formed, mounting a non-evaporable gettering alloy selected from the group consisting of Zr-Ni-Nb and Zr-V-Fe on one of the inner bottle and outer bottle members, joining the inner bottle and outer bottle to form a double walled bottle, forming a silver mirror layer on said oxide layer by a silver mirror reaction, and then evacuating said space between said two bottles.

2. The process according to claim 1 wherein said non-evaporable getter consists of a Zr-V-Fe alloy and is mounted on the inner surface of one of the bottle members.

3. The process according to claim 1 wherein said non-evaporable getter consists of a Zr-Ni-Nb alloy and is mounted on the inner surface of one of the bottle members.

4. A method of making a stainless steel vacuum bottle, which comprises preparing inner and outer bottle members, oxidizing at least the outer surface of the stainless steel inner bottle member to form an oxide layer thereon, forming a silver mirror layer on the oxide layer, and evacuating the space between the bottle members.

5. A method according to claim 4 wherein the oxidation is carried out before assembly of the bottle members to form the bottle, and the formation of the silver mirror layer is carried out after said assembly.

6. A method according to claim 4 wherein a non-evaporable getter is mounted to one of the bottle members so as to be located in the evacuated space before the formation of the silver mirror layer but after oxidation.

* * * * *